April 26, 1949. E. D. DEMPSEY 2,468,182
POWER TAKE-OFF FOR TRUCKS
Filed April 30, 1946
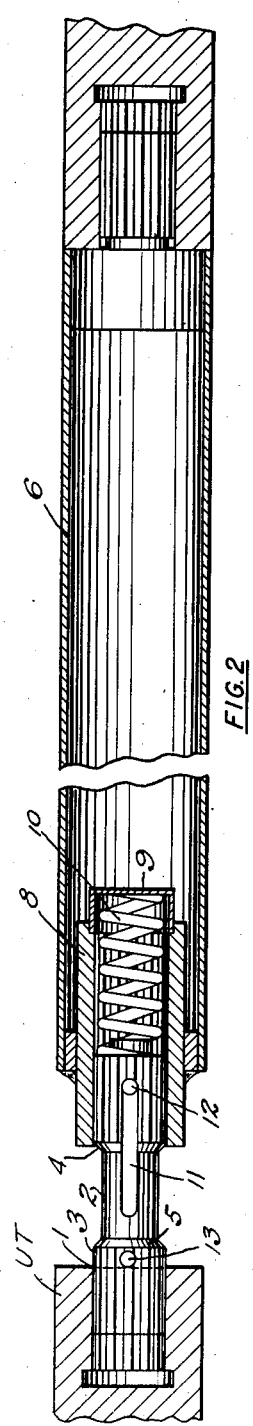
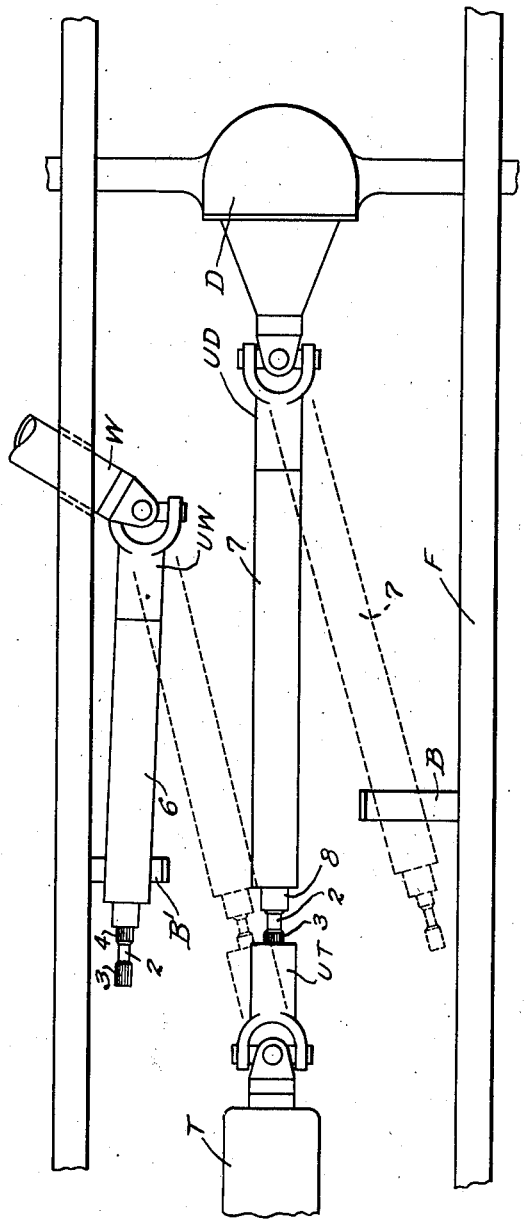
E.D. DEMPSEY
Inventor
E.D. DEMPSEY
By Mason Fenwick & Lawrence
Attorneys Patented Apr. 26, 1949

2,468,182

UNITED STATES PATENT OFFICE 2,468,182

POWER TAKE-OFF FOR TRUCKS

Eugene D. Dempsey, Louisville, Miss.

Application April 30, 1946, Serial No. 665,970

4 Claims. (Cl. 64—1)

This invention relates to a power take-off for trucks.

An object of the invention is to provide an improved and simplified device by means of which power can be taken from the engine of a conventional truck for use in connection with auxiliary machinery with a minimum of trouble and with assurance.

The invention consists in the novel construction, arrangement, and combinations of parts hereinafter more particularly described and claimed.

One sheet of drawings, largely diagrammatic, accompanies this specification as part thereof, in which like reference characters indicate like parts throughout.

In the drawings:

Figure 1 is a fragmentary plan view of a part of a conventional truck chassis showing the present invention applied; and, Figure 2 is a transverse, cross-section taken through the improved device.

In the drawings, T represents a conventional power transmission unit connected to a conventional transmission universal joint UT, while D indicates a conventional differential associated with a conventional universal differential joint UD.

7 represents a torque tube which differs from the conventional torque tube in being shortened sufficiently to accommodate a stub shaft 2 having its ends 3—4 provided with outwardly directed feathers.

The universal transmission joint is provided with a socket having complementary internally directed splines or feathers adapted to receive one end 3 of the stub shaft 2 to provide a positive connection between said parts.

Conveniently, the stub shaft 2 will be provided with a transverse pin 13, the ends of which will project from the sides of the outwardly splined or feathered portion 3 to limit the extent to which said portion can enter the socket in the universal transmission joint.

In the forward end of the shortened torque tube 7 is rigidly secured a tube 8 provided with inwardly directed splines or feathers complementary to the outwardly directed splines of the end 4 of the stub shaft 2, which end 4 of said stub shaft is slidable within said tube 8.

To the inner end of the tube 8 is secured a cap or spring seat 9 and a compression spring 10 is positioned in said tube between the cap 9 and the inner end of part 4 of the stub shaft 2, thus tending to normally project said stub shaft forwardly and into locking engagement with the universal transmission joint UT.

The forward motion of the stub shaft 2 is limited by a transverse pin 12 extending diametrically through the sleeve 8 and which is received in a longitudinally disposed slot 11 provided in stub shaft 2.

By reason of the structure thus described, it will be apparent that by engaging the stub shaft 2 with the hand, it can be readily retracted within tube 8 to disengage the forward spline end 3 from the universal transmission joint, and thereafter swung on the differential universal joint to the position indicated in dotted lines in Figure 1, where its loose end can be conveniently supported by a bracket B secured to the frame F of the truck.

For transmitting power to auxiliary machinery, a second torque tube 6 is provided, associated at one end with a universal work joint UW and having at its other end a similar structure described for the shaft 7.

A second bracket b' secured to the opposite or any suitable part of the chassis frame will support the free end of the torque tube 6 when not in use and when power is being taken from the motor it will be engaged to the universal transmission joint UT, as indicated in dotted lines in Figure 1.

It will be observed that by means of the stub shaft connection, there is no possibility of this connection being lost or misplaced, and it is always ready and available for use either in connecting the main drive torque tube 7 when the truck is to be used as a vehicle, or the auxiliary torque tube 6 when the engine of the truck is to be used to furnish power to auxiliary machinery.

Various modifications in the precise form and proportions of the parts will readily suggest themselves to those skilled in the art but within the scope of the present invention as claimed.

Having thus described my invention, I claim:

1. Quick release coupling for drive shafts comprising an internally splined sleeve associated with one end of a shaft, said sleeve having at its inner end a compression spring seat, a stub shaft having its ends formed with external splines, means for securing one splined end of the stub shaft slidable axially in the sleeve, a compression spring positioned in the sleeve between the end of the stub shaft and the spring seat and a universal joint member formed with an internally splined socket to receive the other splined end of the stub shaft.

2. Device as specified in claim 1, with stop devices associated with the stub shaft to limit the slidable movement of the stub shaft with respect to the sleeve.

3. Device as specified in claim 1 in which the stub shaft is formed with longitudinally extending through slot with a pin extending transversely through the sleeve and through said slot to limit the slidable movement of the stub shaft in the sleeve.

4. Quick release coupling for drive shafts comprising a shaft internally splined sleeve having an abutment for a compression spring, said sleeve rigidly associated with the end of the shaft, a stub shaft having outwardly splined end parts, a universal joint formed with an internally splined socket, the stub shaft adapted to seat with its splined ends in said splined socket and the sleeve, with a compression spring between the end of the stub shaft in the sleeve and the abutment in said sleeve, said stub shaft being slidable with respect to said socket and sleeve and of a length to permit disengagement from the socket when retracted into the sleeve against the pressure of said spring.

EUGENE D. DEMPSEY.

REFERENCES CITED

The following references are of record in the file of this patent:

UNITED STATES PATENTS

| Number | Name | Date |
|---|---|---|
| 1,456,289 | Story | May 22, 1923 |
| 1,631,236 | Werner | June 7, 1927 |
| 1,828,087 | Vlcek | Oct. 20, 1931 |
| 1,881,609 | Hume | Oct. 11, 1932 |
| 1,908,437 | Nelson | May 9, 1933 |
| 2,031,399 | White | Feb. 18, 1936 |
| 2,097,703 | Ronning | Nov. 2, 1937 |
| 2,248,332 | Budelier | July 8, 1941 |